(12) United States Patent
Ondrasik

(10) Patent No.: US 6,926,291 B1
(45) Date of Patent: Aug. 9, 2005

(54) SHOPPING CART

(76) Inventor: V. John Ondrasik, 6150 Commerce St., Commerce, CA (US) 90040-2407

( * ) Notice: Subject to any disclaimer, the term of this patent is extended or adjusted under 35 U.S.C. 154(b) by 120 days.

(21) Appl. No.: 10/401,341

(22) Filed: Mar. 26, 2003

(51) Int. Cl.$^7$ ............................................. B62D 39/00
(52) U.S. Cl. ............................ 280/33.991; 280/47.34; 280/DIG. 4; 280/33.997
(58) Field of Search ...................... 280/33.991, 33.992, 280/33.993, 33.997, 47.34, DIG. 4

(56) References Cited

U.S. PATENT DOCUMENTS

| | | |
|---|---|---|
| 2,443,236 A | 6/1948 | Gallagher |
| 2,479,530 A | 8/1949 | Watson |
| 2,837,344 A | 6/1958 | Young |
| 2,890,057 A | 6/1959 | Davis |
| 2,901,262 A | 8/1959 | Berlin |
| 2,998,978 A | 9/1961 | Sides |
| 3,015,494 A * | 1/1962 | Trubiano ............... 280/33.992 |
| 3,375,018 A | 3/1968 | Close |
| 3,645,554 A * | 2/1972 | Von Stein et al. ...... 280/33.991 |
| 3,909,034 A * | 9/1975 | Trubiano ................. 280/47.34 |
| 4,381,870 A * | 5/1983 | Muellner ............... 280/33.993 |
| 4,423,882 A * | 1/1984 | Stover et al. .......... 280/33.993 |
| 4,647,055 A * | 3/1987 | Weill ..................... 280/33.992 |
| RE32,453 E | 7/1987 | Stover |
| 4,678,195 A * | 7/1987 | Trubiano ............... 280/33.992 |
| 5,322,306 A * | 6/1994 | Coleman ............... 280/33.992 |
| 5,366,123 A * | 11/1994 | Range ......................... 224/411 |
| 5,507,507 A | 4/1996 | Davidson |
| 5,595,394 A | 1/1997 | Adamson |
| 5,865,449 A | 2/1999 | Castaneda |
| 6,098,998 A | 8/2000 | Ondrasik |
| 6,126,181 A | 10/2000 | Ondrasik |
| 6,422,580 B1 * | 7/2002 | Hunter .................. 280/33.992 |
| 6,488,292 B2 * | 12/2002 | O'Quin ................. 280/33.991 |
| 6,644,674 B2 * | 11/2003 | Simard .................. 280/33.991 |

* cited by examiner

Primary Examiner—Christopher Ellis
Assistant Examiner—Brian Swenson
(74) Attorney, Agent, or Firm—Gordon & Rees LLP

(57) ABSTRACT

A shopping cart has a wheeled base, a rear frame projecting upwardly from the rear end of the base with a handle at its upper end, and a basket having a rear end secured to the frame and projecting forwardly from the frame at a spacing above the base. The basket is closed by a pivoted rear gate at its rear end. A fixed child seat is secured to the cart adjacent the upper end of the rear frame so as to project forwardly from the rear frame above the basket. Two or more carts can be nested together by pushing the front wall of the basket of a first cart through the rear frame beneath the fixed child seat of a second cart, simultaneously pivoting the rear gate upwardly to allow the basket of the first cart to enter the basket of the second cart. Removable caster lifts may be located on the base such that the rear wheels of a forward cart are lifted when two carts are nested.

23 Claims, 4 Drawing Sheets

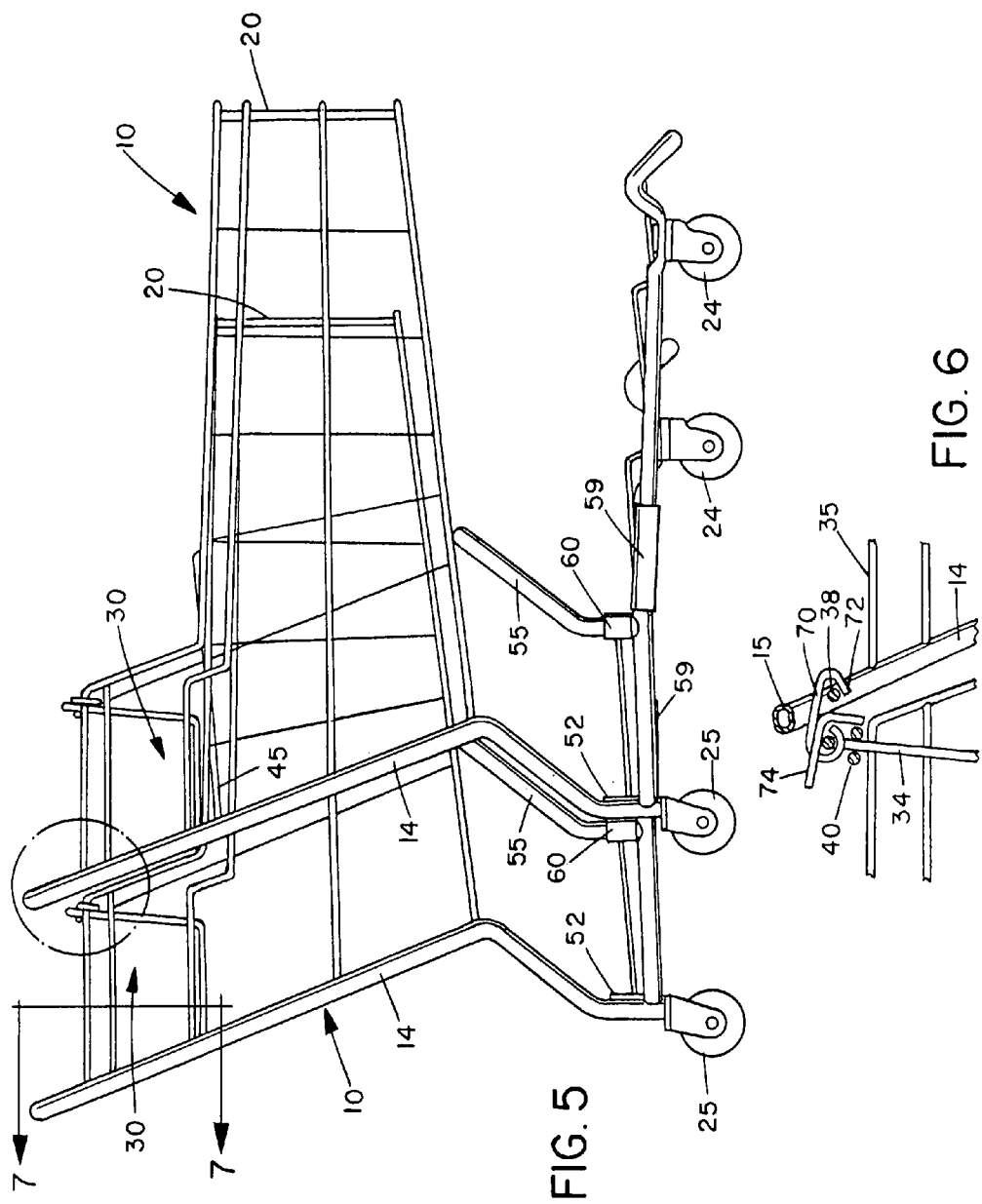

SHOPPING CART

BACKGROUND OF THE INVENTION

This invention relates generally to shopping carts and is particularly concerned with shopping cart nesting arrangements.

Traditional shopping carts have a pivoted child seat on the rear wall, which is pivoted away from the rear wall to use the seat. On nesting, the child seat is collapsed and the seat and rear wall are lifted by the front end of a cart nesting in from the rear. At the same time, the lower tray is also pivoted and is lifted by the lower end of the nesting cart. The various movable parts of such carts to permit nesting will tend to rattle as the cart travels, and also make nesting more difficult. Separating nested carts can also be a problem when these parts become stuck or jammed together.

U.S. Pat. No. 2,890,057 of Davis describes a conventional type of collapsing baby seat on a cart. Shopping carts are known which have different nesting arrangements, but these are subject to some other disadvantages. In my U.S. Pat. No. 6,126,181, a shopping cart with stepped, completely separate upper and lower baskets is described, in which the lower basket is offset forwardly from the upper basket, so that the lower basket of a rear cart can be nested under the upper basket of a forward cart for storage. The upper basket may include a child seat. However, the baskets are of reduced size and terminate short of the forward end of the cart. The base or lower tray is fixed and is stepped to permit nesting. In my U.S. Pat. No. 6,098,998, a shopping cart is described which has a child seat at the front end of the cart, and a pivoted rear wall for nesting. The lower tray or base is inclined downwardly from the rear to the front end of the cart to permit nesting without having to lift the lower tray, reducing moving parts.

SUMMARY OF THE INVENTION

It is an object of the present invention to provide a new and improved shopping cart with an improved nesting arrangement.

According to the present invention, a shopping cart is provided which comprises a wheeled base having a front end and a rear end, a rear frame projecting upwardly from the rear end of the base and having a handle at its upper end, a basket having a rear end secured to the frame and projecting forwardly from the frame at a spacing above the base, the basket having a front wall, spaced side walls, a lower wall, and an open rear end, a fixed child seat secured to the rear frame adjacent the upper end of the frame, and a rear gate pivoted at the rear frame below the child seat to close the open rear end of the basket, whereby two or more carts can be nested together by pushing the front wall of the basket, of a first cart through the rear frame beneath the fixed child seat of a second cart, simultaneously pivoting the rear gate upwardly to allow the basket of the first cart to enter the basket of the second cart.

This invention provides a nestable cart with a fixed child seat at the rear end of the cart, close to the customer pushing the cart. In an exemplary embodiment of the invention, the side walls of the basket have a raised rear portion and a downwardly stepped front portion, and the child seat is secured between the raised rear portions of the side walls such that a base of the seat is spaced above the downwardly stepped front portion of the side walls and the seat extends forwardly from the rear frame. The basket may extend to the front end of the cart, so that the amount of storage space for items to be purchased is not reduced. The base of the cart may have a hinged lower platform for nesting, or may have a fixed platform which is inclined downwardly or stepped to permit nesting.

A latch may be provided for latching the forward end of child seat of a rear cart to the rear end of the child seat of a forward cart into which the rear cart is nested. This will permit a row of nested carts to be easily secured together, such that they can be more easily transported from a parking lot to a store.

In an exemplary embodiment of the invention, the base of the cart comprises a generally U-shaped frame projecting forwardly from the rear frame and having an open rear end, the frame having inwardly tapered side walls for permitting nesting, and a stepped tray secured to the frame, the tray having a series of downwardly stepped portions extending from the rear end to the front end of the base. These portions each provide a horizontal support surface for goods placed on the tray, while at the same time permitting nesting of the base of one cart into the rear end of the base of another cart. The base may incorporate removable caster lifts which engage over the frame so that the rear wheels of a forward cart are lifted slightly when a rear cart is nested into the forward cart. The removable "caster lift" design is a substantial improvement over permanent caster lifts that have been used in the past.

The shopping cart of this invention has a significantly reduced number of moving parts, only requiring a small, relatively light rear gate for nesting, and has a completely fixed child seat which is more stable and secure. A fixed child or baby seat has many advantages over traditional, collapsible child seat assemblies. The fixed baby seat does not rattle, is lighter, does not damage seat belts, provides an area for a full size cup holder, provides a much larger "small item" basket when not needed for a child or baby, and makes carts easier to nest and less likely to jam or become stuck together. This new cart design will require significantly less maintenance than traditional carts with moveable child seats.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 5 is a side view showing two carts nested;

FIG. 6 is an enlarged view, partially cut away, of the area 6 in FIG. 5, showing a latch for holding carts together;

DETAILED DESCRIPTION OF THE DRAWINGS

Figure 1:
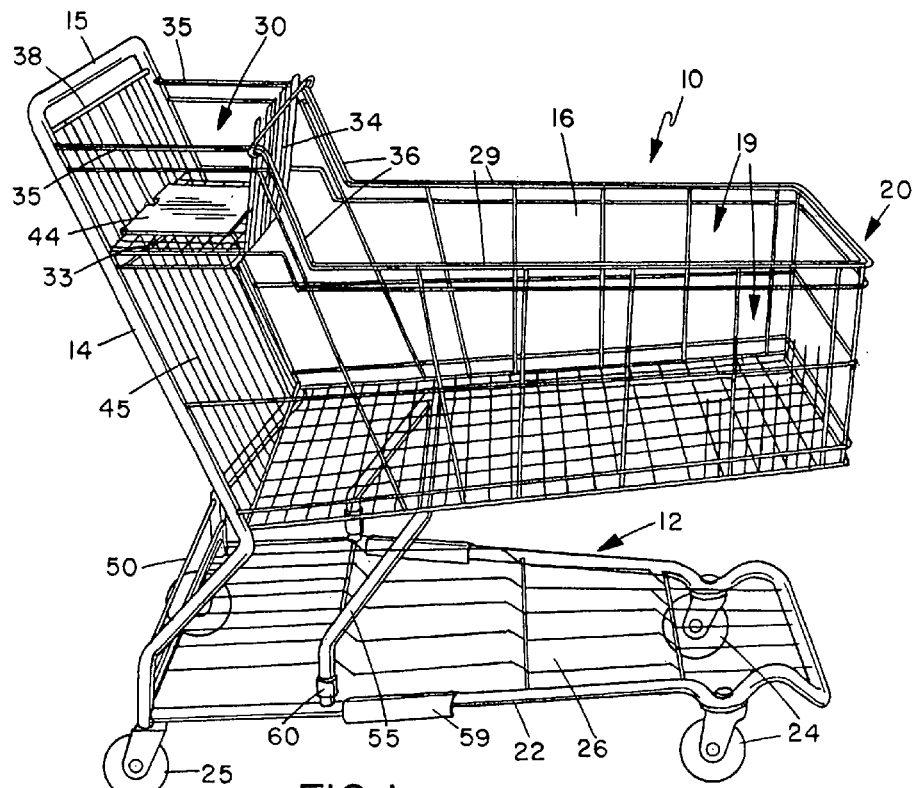
FIG. 1 is a perspective view of a shopping cart according to an exemplary embodiment of the invention.

The drawings illustrate a shopping cart 10 according to an exemplary embodiment of the present invention. As best illustrated in FIG. 1, the cart 10 basically comprises a wheeled base 12, a rear frame 14 projecting upwardly from the base 12 at the rear end of the cart and having a handle 15 at its upper end, and a basket 16 projecting forwardly from the rear frame at a location spaced above the base 12. Basket 16 has a lower wall 18, spaced side walls 19, and a front end wall 20, all of wire or plastic grille construction. Base 12 comprises a generally U-shaped frame 22 with side walls tapering outwardly from the front to the rear end of the cart, with the frame being open at its rear end, front caster wheels 24 and rear caster wheels 25, and a tray 26 welded to the frame to support items on the base of the cart.

Figure 2:
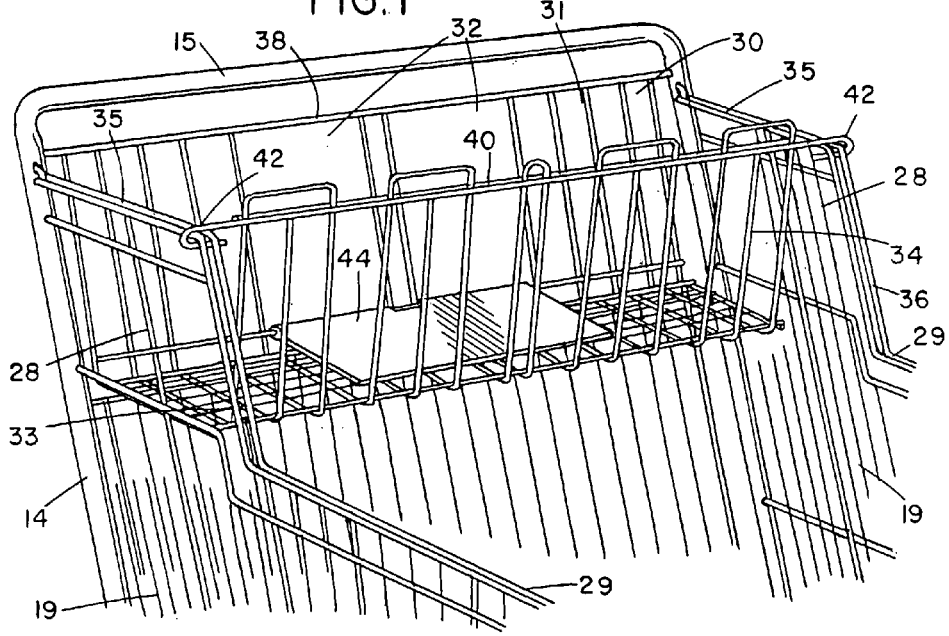
FIG. 2 is an enlarged perspective view of the upper portion of the cart, showing the seat structure.
Figure 3:
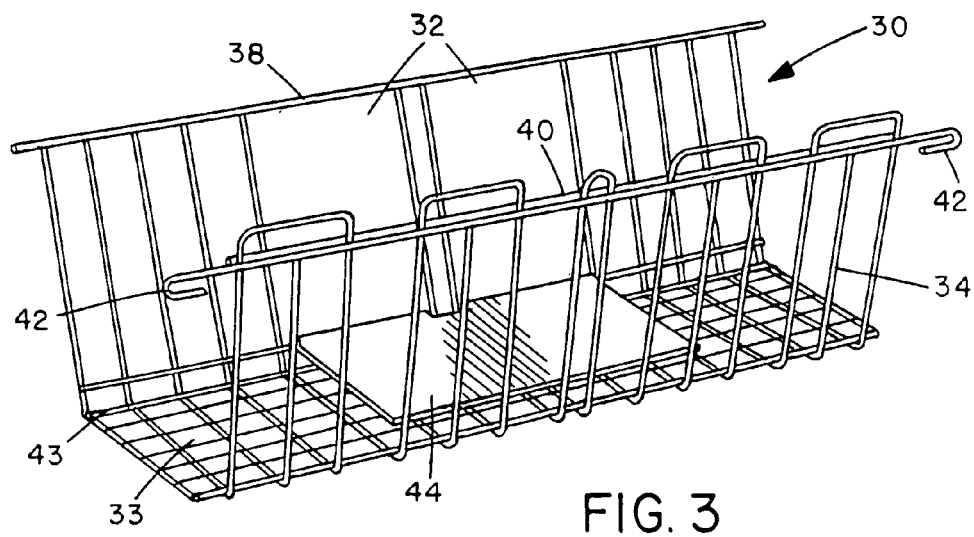
FIG. 3 is a perspective view of the seat frame.

Each side wall 19 has a raised rear end portion 28 and a downwardly stepped portion 29 projecting forwardly from the rear end portion to the front end wall 20. A fixed child or baby seat 30 is secured between the raised rear end portions 28 of the side walls at the rear end of the cart, as best illustrated in FIG. 2. The seat 30 has a rear wall 31 with leg openings 32, a base 33, and a front wall 34 (see FIGS. 2 and 3). The base is located above the downwardly stepped portions of the side walls, as can be seen in FIG. 1. The rear wall 31 may be secured by welding or the like between opposite sides of the rear frame 14 adjacent handle 15, as indicated. The front wall 34 may be secured by welding or like to the raised rim 35 of the opposite raised rear portions 28 of the side walls of the basket, adjacent the step 36 down to the downwardly stepped portion 29 of each side wall. In the illustrated embodiment, the rear wall of the seat has an upper rail 38 which has opposite ends welded to opposite sides of the rear frame 14 at a small spacing below handle 15, as best illustrated in FIG. 3, while the front wall 34 has an upper rail 40 with hooked ends 42 which are hooked or snapped over opposite portions of the upper rim 35 of the raised portion 28 of each side wall of the basket. The lower rail 43 of the rear wall may also be welded to opposite sides of the rear frame 14. In an alternative embodiment, the rear and front walls of the seat are both welded to opposing portions of the side walls at their upper and possibly also the lower corners. The child or baby seat has a conventional plastic flap 44 for supporting a child in the lowered position of FIGS. 2 and 3. This is pivoted to the rear wall so that it may be raised in a conventional manner to cover openings 32 when it is desired to use the child seat as an auxiliary basket for carrying small items.

The rear end of the main basket 16 is open beneath child seat 30, and a rear gate 45 of lightweight construction is pivoted to the lower rail 43 of the child seat so as to close the open rear end of the basket while in use. Rear gate 45 will be lifted inwardly and upwardly when another cart is nested in from the rear, as described below in connection with FIG. 5.

Figure 4:
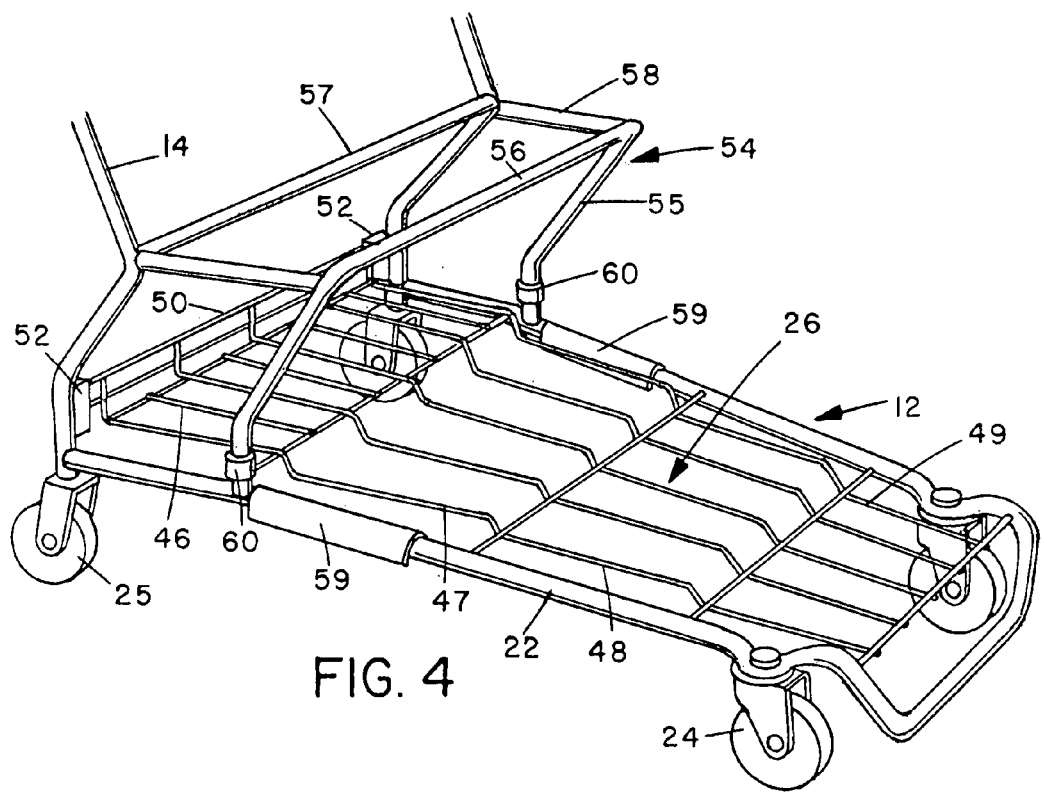
FIG. 4 is an enlarged perspective view of the lower portion of the cart.
Figure 7:
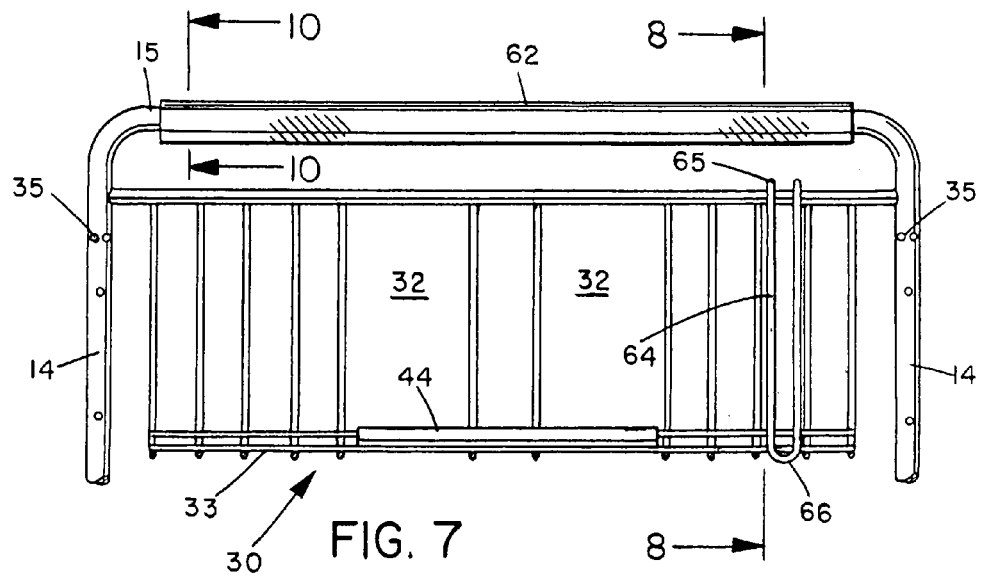
FIG. 7 is an enlarged sectional view taken on line 7—7 of FIG. 5, showing a retractable hanger in the retracted position.

Lower tray 26 is welded between opposite sides of the base frame 22 and has a series of four horizontal steps 46,47,48,49 of progressively lower height between the rear end and the front end of the cart, as illustrated in FIGS. 1 and 4. The rearmost step 46 has a raised rear rim 50 which is welded between opposite sides of rear frame 14, as best illustrated in FIG. 4. A pair of plastic caster lift members 52 are removably mounted on rim 50 adjacent the opposite sides of frame 14, so as to project downwardly from the rim a short distance. Although four horizontal steps are illustrated, the tray 26 may have only two or three steps, or any number of steps, in alternative embodiments. In other embodiments, the lower tray may be eliminated, so that the base comprises only the lower, u-shaped frame. In this case, a separate piece may be welded between the opposite sides of the rear frame, in place of rim 50, to mount the caster lift members 52.

As illustrated in FIG. 4, an additional support frame is provided for the lower wall of the basket, spaced forwardly from rear frame 14. The additional support frame comprises a U-shaped frame member having bars 55 projecting upwardly from opposite sides of the base frame 22, with a cross bar 56 at its upper end, a second cross bar 57 between opposite sides of the rear frame 14 aligned with cross bar 56, and connecting bars 58 between the ends of cross bars 56 and 57, forming a square frame support for the basket. A first sleeve 59 is snapped over each side of base frame 22 in front of the respective bar 55, and a second sleeve 60 is snapped over the lower portion of each bar 55, as indicated in FIG. 5. These are for smooth sliding and protection of the frame on nesting, as discussed in more detail below, and are of plastic or other suitable smooth material.

Figures 8, 9:
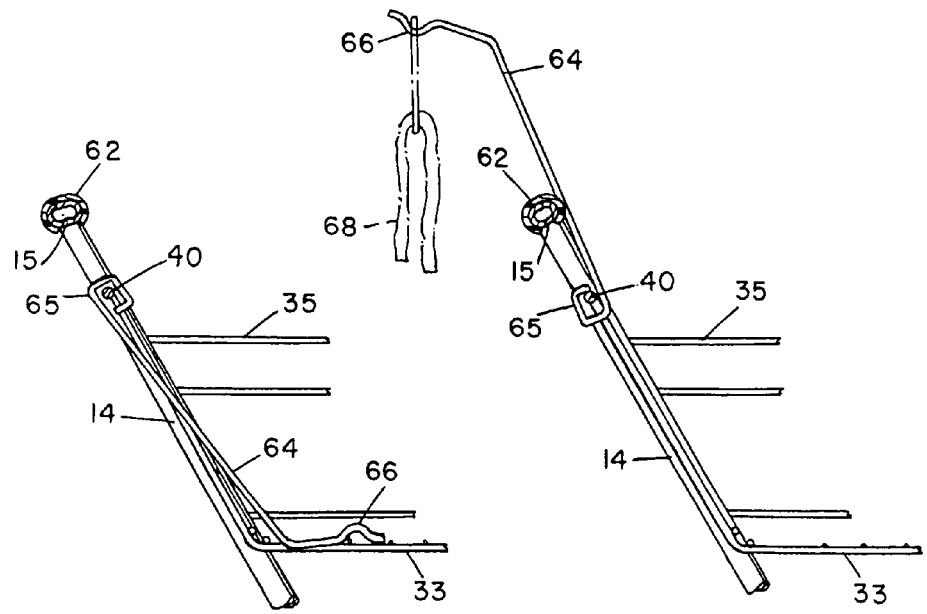
FIG. 8 is a sectional view taken on line 8—8 of FIG. 7.
FIG. 9 is a view similar to FIG. 8, but with the hanger in an extended position.
Figure 10:
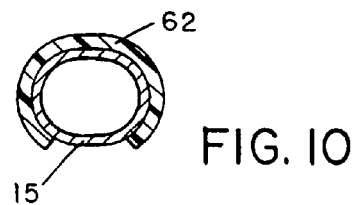
FIG. 10 is an enlarged sectional view taken on line 10—10 of FIG. 7.

In an exemplary embodiment of the invention, a sleeve or cover 62 of plastic or the like is also snapped over handle 15, as best illustrated in FIGS. 7 to 10. The handle may be flattened as indicated in FIG. 10 to resist rotation of the round sleeve 62. The store name may be printed on the flattened portion of the handle 15, or on an inner or outer surface of sleeve 62. FIGS. 8 and 9 illustrate an optional carrying hook 64 which may be secured to the upper rail 38 of child seat 30, as indicated or to the handle 15 or to a mount below the handle. The hook 64 is shown in a stored position in FIG. 8, and in a deployed position in FIG. 9. The hook has an end loop or ring 65 looped over the rail 38, and in the position of FIG. 8 it hangs down against the rear wall 31 of the child or baby seat, with the bent, hooked end 66 lying on the base 33 of the seat. If a customer wants to use the hook to hang items on hangers, or a bag, from the rear of the cart, they simply rotate it upwardly into the deployed position of FIG. 9, when an item such as a bag 68 or a hanger carrying clothing can be suspended from it, leaving more room in the cart. Filled bags of groceries, or other bags, may also be hung from the hooked end 66 of the hook 64. This type of hook could not be used with the traditional collapsible baby seat assembly.

Nesting of two or more carts to conserve space when the carts are not in use will now be described with reference to FIGS. 5 and 6. FIG. 5 illustrates two carts nested together. The rear cart is pushed into the rear end of the forward cart, so that the front end wall 20 of the rear cart basket pushes up the rear gate 45 of the front cart basket, and the rear cart basket slides into the front cart basket under the front cart seat 30. At the same time, the front end of the wheeled base 12 of the rear basket will enter the space beneath the rear end of the tray of the front basket. As the rear cart continues to travel inwards, the first sleeves 59 on opposite sides of the lower frame will engage under the respective caster lift members 52 at the rear end of the tray of the forward cart. Both the sleeves and the lift members can be made of materials such as plastic that will help the lower frame to slide smoothly into the fully nested position. When fully nested, the second sleeves 60 may engage the rear end of the tray of the forward cart, reducing any risk of damage. At the same time, the engagement between the first sleeves and caster lift members will lift the rear end of the forward cart slightly, so that its rear wheels 25 are raised slightly off the ground, as indicated in FIG. 5. When a plurality of carts are nested together in a line, only the cart front swivel wheels and the rear wheels of the rearmost cart will touch the ground, making steering of the line of carts back to a store much easier. The caster lift effect may be provided with only the members 52 or sleeves 59, if desired, and 60 is not essential.

Nested carts may also be latched together as indicated in FIG. 6. Each cart may have a latch 70 mounted on the upper rail 40 of the front wall of baby seat 30, which engages or snaps over the upper rail 38 of the rear wall of the baby seat of the cart in front when two carts are nested together, as indicated in FIG. 6. This means that all carts in a nested line of carts can be latched together. This is particularly useful where the rear wheels of all of the nested carts except the rear one are lifted off the ground, in the manner described above. This makes the row of carts much easier to maneuver. The latch is constructed with a ramp 72 so the latch lifts and engages automatically when the carts are nested (see FIG. 6). The carts can easily be unlatched by the customer (or someone else) depressing release member 74 when the carts are to be separated. The vertical arm of release member 74 will hold the latch in a horizontal orientation after release. This system will not work with the traditional collapsible baby seat.

The shopping cart of this invention has many advantages over more traditional carts. This cart has a fixed baby seat and a fixed lower tray, avoiding the need to have a liftable and collapsible baby seat, and a liftable lower tray. Having fewer mobile parts is advantageous since it reduces rattling when the cart is in use, and makes carts lighter, easier to nest, less liable to jam together when nested, and will require significantly less maintenance. In the illustrated embodiment, the baby seat is secured between raised side portions of the basket side walls. However, it will be understood that the basket may have side walls of uniform height in alternative embodiments, and the baby seat may be simply welded to the rear frame of the cart to project forwardly from the rear frame above the basket.

Another advantage of having fewer moving parts is that it will reduce wear in carts which are powder coated rather than chrome plated. The fixed baby seat also provides a much larger "small item" basket, is less liable to cause damage to seat belts in the baby seat for holding a child in place, and also allows carts to be latched together when nested, as indicated in FIG. 6, making transportation of a line of nested carts from one place to another much easier.

The cart also has a removably mounted caster lift arrangement, comprising the removable plastic sleeves 59 on the lower frame, and the caster lift member 52 at the rear end of the lower tray, both of which are designed to be snapped onto the cart. Traditional "caster lifts" involve welded-in components and are permanent. Sliding plastic on plastic or other suitable material is much smoother than the traditional steel on steel. Also, if the plastic parts wear they can be easily replaced, and they can be removed altogether if a caster lift is not desired.

Although an exemplary embodiment of the invention has been described above by way of example only, it will be understood by those skilled in the field that modifications may be made to the disclosed embodiment without departing from the scope of the invention, which is defined by the appended claims.

I claim:

1. A shopping cart, comprising:
   a wheeled base having a front end and a rear end;
   a rear frame projecting upwardly from the rear end of the base and having a handle at its upper end;
   a single basket having a rear end secured to the frame and projecting forwardly from the frame at a spacing above the base, the basket having a front wall, spaced side walls, and a lower wall together defining an enclosure for articles to be purchased, the basket being open at its rear end;
   each side wall of the basket having a rear portion extending forwardly from the rear frame up to a forward end, a downward step at the forward end of the rear portion, the downward step having a lower end, and a forward portion of reduced height extending from the lower end of the downward step to the front wall of the basket;
   a fixed child seat secured between the rear portions of the side walls of the basket adjacent the upper end of the rear frame so as to project forwardly from the rear frame, the child seat having a base spaced above the forward portion of the basket; and
   a rear gate pivoted at the rear frame below the child seat to close the open end of the basket, whereby two or more carts can be nested together by pushing the front wall of the basket of a first cart through the rear frame beneath the fixed child seat of a second cart, simultaneously pivoting the rear gate upwardly to allow the basket of the first cart to enter the basket of the second cart.

2. The cart as claimed in claim 1, wherein the basket extends to the front end of the cart.

3. The cart as claimed in claim 1, including a hook member rotatably mounted at the rear end of the cart for rotation between a stored, downwardly extending position resting against the rear wall of the child seat, and an upwardly rotated, deployed position projecting upwardly from the handle, the hook member having a shaft portion and a hook portion projecting at an angle to the shaft portion, the shaft portion projecting rearwardly from the handle at a location spaced above the handle in the deployed position, whereby items can be hung from the hook portion at the rear of the cart.

4. The cart as claimed in claim 1, wherein the wheeled base of the cart comprises an outer frame, wheels secured to the outer frame, and a tray secured to the outer frame so as to provide a support for items placed on the tray.

5. The cart as claimed in claim 4, wherein the tray has at least two horizontal steps of progressively lower height from the rear end to the front end of the base.

6. The cart as claimed in claim 5, wherein the tray has a series of horizontal steps of progressively lower height from the rear end to the front end of the base.

7. The cart as claimed in claim 1, wherein the child seat has a rear wall secured at the rear frame of the cart beneath the handle, a base, and a front wall spaced forwardly from the base, the rear wall having leg openings.

8. The cart as claimed in claim 7, wherein the front and rear walls of the child seat are secured between opposite side walls of the basket.

9. The cart as claimed in claim 7, wherein the rear frame has spaced side bars, the rear wall of the child seat is secured between the side bars, and the front wall of the child seat has hooks for snap engagement over the side walls of the basket.

10. The cart as claimed in claim 7, including a latch mounted on the front wall of the child seat for latching engagement over the rear wall of the child seat of a second cart when two carts are nested together.

11. The cart as claimed in claim 1, wherein the wheeled base of the cart has a pair of rear wheels and a pair of forward wheels, and a removable caster lift mechanism is releasably secured to the base for lifting the rear wheels of a forward, first cart when a second, rear cart is nested into the forward cart.

12. The cart as claimed in claim 11, wherein the wheeled base comprises a generally U-shaped frame and a tray secured across the frame, the U-shaped frame having opposite side rails, and the tray having a raised rear end secured across the rear frame, the caster lift mechanism comprising a pair of lift members releasably secured to the raised rear end of the tray adjacent opposite sides of the base frame, the lift members each projecting downwardly from the raised rear end of the tray, and a pair of sleeve members removably mounted on opposite side rails of the U-shaped frame at a predetermined location spaced forwardly from the raised rear end of the tray, such that when a forward and rear cart are nested together, the sleeve members of the rear cart engage beneath the lift members of the forward cart to raise the rear wheels of the forward cart from the ground.

13. The cart as claimed in claim 11, wherein the wheeled base has opposite side rails and a rear support rail extending across the rear frame, at least one removable caster lift member being mounted on one of said rails.

14. The cart as claimed in claim 13, wherein at least one first removable caster lift member is mounted on said rear rail to project downwardly from said rear rail, whereby the lift member of a forward cart will engage the base of a rear cart to lift the rear wheels of the forward cart as the rear cart is nested into the forward cart.

15. The cart as claimed in claim 14, wherein at least one second caster lift member is removably mounted on one of said side rails for engaging said first lift member when two carts are nested.

16. The cart as claimed in claim 14, wherein a pair of first caster lift members are removably mounted on said rear support rail adjacent opposite sides of said base.

17. The cart as claimed in claim 16, wherein a pair of second caster lift members are removably mounted on said opposite side rails at a predetermined position for engagement with said first caster lift members of a forward cart when two carts are nested together.

18. The cart as claimed in claim 17, wherein said caster lift members are of plastic material.

19. The cart as claimed in claim 17, wherein the side rails are inclined downwardly at said predetermined position.

20. The cart as claimed in claim 19, wherein said second caster lift members comprise slit sleeves each having a rounded upper surface for engagement with the respective first caster lift member of a forward cart.

21. A shopping cart, comprising:
a wheeled base having a front end and a rear end;
a rear frame projecting upwardly from the rear end of the base and having a handle at its upper end;
a single basket having a rear end secured to the rear frame and projecting forwardly from the frame at a spacing above the base, the basket having a front wall, spaced side walls, and a lower wall defining an enclosure for carrying items to be purchased in the shopping cart, and being open at its rear end;
each side wall of the single basket having a raised rear portion extending from the rear frame and an integral, lowered forward portion of reduced height extending up to the front wall;
a fixed child seat secured between the raised rear portions of the side walls of the basket adjacent the upper end of the rear frame so as to project forwardly from the rear frame; and
a rear gate pivoted at the rear frame below the child seat to close the open end of the basket, whereby two or more carts can be nested together by pushing the front wall of the basket of a first cart through the rear frame beneath the fixed child seat of a second cart, simultaneously pivoting the rear gate upwardly to allow the basket of the first cart to enter the basket of the second cart.

22. The cart as claimed in claim 21, wherein the child seat has a base spaced above the forward portion of the side walls.

23. The cart as claimed in claim 21, wherein the rear portion of each side wall has a forward end of a first height, the forward portion has a rear end of a second height less than the first height, and an integral downward step in the side wall connects the forward end of the rear portion to the rear end of the forward portion.

* * * * *